Patented Oct. 19, 1943

2,332,075

UNITED STATES PATENT OFFICE 2,332,075

EPINEPHRINE DERIVATIVE AND PREPARATION THEREOF

Edwin L. Gustus, Chicago, Ill., assignor to Wilson & Co., Inc., a corporation of Delaware No Drawing. Application May 24, 1940,
Serial No. 336,959

13 Claims. (Cl. 167—65)

The present invention relates to improvements in compounds of epinephrine and preparations containing the same. While it is intended that the compounds prepared in accordance with the present invention and the preparations containing the same shall be suitable for administration to human beings and animals, the materials and preparations are not limited to such uses by procedures now known, since the entire range of products and preparations retains the physiological effectiveness of epinephrine.

As is known, epinephrine is an extremely effective drug for combating the manifestations of allergy, particularly asthmatic conditions. It is exceedingly prompt and efficient in its action, but by ordinary methods of administration in aqueous solution, its effects rapidly disappear.

Efforts have been made to administer epinephrine or its derivatives in a form which will secure continued activity over a substantial period of time. For example, epinephrine base has been suspended in finely divided form in oils and the resulting suspension injected subcutaneously or intramuscularly to secure a continued, slow absorption of the epinephrine by the body fluids. However, such suspensions are difficult to prepare under sterile conditions and are unstable, the epinephrine base rapidly settling out.

The compounds and preparations of the present invention have a particular utility in providing means for the administration of epinephrine to secure prolonged effectiveness and physiological activity. However, their usefulness is not restricted to this purpose, as will be readily apparent from the following description of the invention, illustrated by specific embodiments thereof.

In carrying out the present invention epinephrine base is caused to combine with a part of the carboxyl groups of a polycarboxylic acid, suitably a dicarboxylic acid, to form a partial salt. For example, in the case of dicarboxylic acids, the mono-epinephrine salt may be formed. The remaining carboxyl group of the acid may be left unesterified, or may be esterified with any suitable alcohol to introduce an alkyl or other hydrocarbon radical, in which case such partial esterification with an alcohol is preferably effected before the introduction of the epinephrine into the compound. The reaction with the epinephrine is preferably carried out in the presence of a suitable solvent, which may subsequently be removed by solvent action or by distillation, suitably under high vacuum to prevent decomposition or oxidation. I have found phenol to be the most satisfactory solvent for this purpose, and in the succeeding examples, the use of phenol is referred to. However, other non-oxidizing solvents may be employed, exercising a solvent action either upon the reaction constituents individually or upon the reaction mixture in the course of the reaction. Such other solvents may be, for example, benzyl alcohol, absolute ethyl alcohol, furfuryl alcohol and tetrahydrofurfuryl alcohol. The solvents and the reagents employed should be substantially aldehyde- and peroxide-free, particularly in the case of solvents such as benzyl alcohol which may be contaminated with minute amounts of aldehydes or peroxides. In using phenol as a solvent, the temperature at which the reaction is carried out is somewhat above the melting point of the phenol. Ordinarily it is preferred to carry out the reaction at a temperature not above about 70° to 75° C., and preferably in the range of 45° to 55° C. The temperature used is apparently not critical, but should not be sufficiently high to cause decomposition or oxidation. Air or oxygen is to be excluded from the vessels in which the reaction is carried out.

Epinephrine can be readily combined with the organic or carboxylic acids by the use of phenol as a solvent. Thus, epinephrine oleate, epinephrine lactate and the like may be readily produced by direct reaction between epinephrine base and oleic acid, lactic acid or other suitable acid, in molten phenol as a solvent, without the decomposition incident to methods hitherto used for their production.

As examples of the polybasic acids which may be employed, maleic, phthalic, succinic and sebacic acids may be referred to. Other acids of the same general character may be employed, such as fumaric acid, adipic acid, malonic acid and the like. For physiological purposes, those are, of course, selected which have the least tendency to produce toxic or other undesirable effects. Acids having a double bond, such as maleic acid, have been found particularly desirable because they exert an inherent antioxidant effect which is important in view of the readily oxidizable character of epinephrine and its derivatives.

The epinephrine salts of the partial esters produced in accordance with the present invention are capable of forming suspensions of a high degree of stability in oils and tri-glycerides of higher fatty acids. They are soluble in the di-glycerides and mono-glycerides of the higher fatty acids and stable dispersions of such epinephrine compounds may be made in mixtures of the oils or tri-glycerides with varying proportions of the di- or mono-glycerides.

In the reactions for the formation of the epinephrine derivatives of the present invention, by properly proportioning the reaction constituents and subsequently removing the solvent, the desired compounds may be secured in substantially pure state. However, when it is desired to secure the compound ultimately in suspension or solution in an oily vehicle, such as the oils, diglycerides or mono-glycerides hereinbefore referred to, the desired proportion of the vehicle may be introduced into the reaction mixture prior to or during the removal of the solvent, and the removal of the solvent may then be effected or completed so as to leave a solution or suspension of the epinephrine derivative in the desired material.

Hereinafter, when oils and glycerides of higher fatty acids are referred to as vehicles in the preparations of the epinephrine derivatives of this invention, it is to be understood that reference is made to normally liquid animal and vegetable oils or their constituents and to derivatives from them; and that they are preferably substantially free of free fatty acids when the compounds are intended for physiological use. Such free fatty acids do not inhibit or prevent the desired solution and dispersion effects, but are undesirable for physiological reasons.

The following examples are illustrative of the present invention:

1. Epinephrine mono-sebacate. 100 mg. of epinephrine base powder and 221 mg. of sebacic acid were placed in a suitable reaction flask, this providing an excess of the sebacic acid. 2.5 grams of crystallized phenol and 1 ml. of mono-glycerides of the fatty acids of a refined, bleached sesame oil were added and the flask warmed to 50–55° C. Complete solution was effected, with formation of a clear liquid, the mono-sebacate being formed. The phenol was then substantially removed in vacuo at a temperature of 35°–40° C. A slow current of nitrogen or carbon dioxide may, if desired, be passed through the flask to facilitate the removal of the phenol. An opaque, glassy residue remained in the flask, which was dissolved by warming in mono-glycerides of the fatty acids of sesame oil, sufficient being used to give a total volume of 45 ml. The solution was centrifuged to remove a minute amount of undissolved material. The solution was a clear, slightly golden, limpid oily liquid, substantially like the solvent in appearance. It was packaged in 2.5 ml. quantities in 5 ml. ampouls under nitrogen. This solution had a strength of 1–500, calculated to epinephrine base, the epinephrine being present as mono-epinephrine sebacate.

Similar mono-epinephrine derivatives may be made by the same general procedure from other polybasic acids, such as the maleic, phthalic, succinic and other polybasic acids mentioned.

2. Epinephrine lauryl maleate. 100 mg. of epinephrine base were placed in a graduated vacuum distillation flask, the air being displaced by an inert gas such as carbon dioxide or nitrogen. 163 mg. of mono-lauryl ester of maleic acid (a slight excess) were added and also 2.5 grams of pure, crystalline phenol. The amount of phenol in this, as in the other examples herein set forth, may be varied, but 2.5 grams were found to be adequate. The amount of the solvent is in no way critical. The flask was then heated to 45° C. The phenol melted and the epinephrine gradually dissolved. A clear colorless solution of the reaction compound was formed. The phenol was now removed, leaving the epinephrine lauryl maleate as a glassy, amorphous residue. In preparing solutions, it is preferred to add a small portion of the solvent or vehicle in which the compound is ultimately to be administered before eliminating the phenol. Thus, 1 ml. of the desired solvent, suitably di-glycerides of purified sesame oil fatty acids, was added before removal of the phenol. The phenol was then sublimed off in a slow stream of carbon dioxide under a vacuum at a temperature of 35 to 45° C., leaving a viscous, oily residue. Sufficient of the di-glycerides of sesame oil fatty acids were now added to bring the total volume to 50 cc. The resulting solution was a clear solution, and was suitably sterilized, for example, by filtration through a Seitz filter, and packaged in the desired quantities in sealed ampouls. On the basis of epinephrine base content, it assays 1–500.

By replacing the sesame oil di-glycerides in the above examples with the mono-glycerides, clear solutions are also formed. If the purified oil itself (the tri-glycerides) are used, a suspension of the epinephrine derivative results, which is found to be quite stable, its stability being apparently aided by the lyophylic or non-polar character of the lauryl ester group.

Epinephrine lauryl sebacate, phthlate and succinate have been prepared in a similar manner, using in each case the mono-lauryl ester of the selected acid. The resulting epinephrine mono-lauryl derivatives are similar in appearance and in solubilities to the maleate compound and their solubilities in the mono-, di- and tri-glycerides of the purified sesame oil are substantially the same as is that of the maleate compound in the corresponding solvents or dispersion media.

While reference has been made to the various glycerides derived from sesame oil, corresponding glycerides derived from other oils have also been employed with each of the epinephrine derivatives; for example, the tri-, di- and mono-glycerides of the fatty acids of peanut oil, olive oil, of oleic acid and the like. In each case the behavior of the epinephrine compound is substantially the same as its behavior in the corresponding glyceride of the sesame oil. There are slight differences in the specific solubilities of these compounds in the different glycerides, but they are all in the same order. Thus, the epinephrine mono-lauryl succinate is the most soluble in tri-glycerides and it is followed in order by the maleate, the phthalate and the sebacate, although all are sufficiently soluble to give fairly stable suspensions when present in a quantity to provide 1 to 500 of epinephrine base. While all are sufficiently soluble to give solutions of this strength in the di- and mono-glycerides, the maleate derivatives are more readily soluble in these solvents.

In the previous examples, reference has been made to the epinephrine salts of the lauryl half-esters of the various dibasic acids. The corresponding ester-salts with higher alcohols, such as with myristyl and stearyl alcohols, instead of lauryl alcohol, have also been prepared and exhibit physical properties and solubility characteristics similar to those described for the lauryl compounds.

The corresponding compounds with lower alcohols, such as the decyl, nonyl, octyl, heptyl, hexyl, amyl, butyl, propyl, ethyl, and methyl alcohols have also been prepared. It has been found that partial esters of both straight and branched chain alcohols, of unsaturated alcohols and of aryl-alkyl alcohols such as benzyl alcohol may be used in carrying out the reaction, if desired. In each of these preparations, as in the case of the lauryl compounds, a slight excess of the mono-ester of the acid is employed in reacting with the epinephrine base. The epinephrine salts of the decyl half-esters of dicarboxylic acids and those in which the decyl group is replaced by other groups with a smaller number of carbon atoms are less soluble in the tri-glycerides of the higher fatty acids than are the corresponding lauryl and higher derivatives. All of the derivatives down to and including the epinephrine methyl derivatives are soluble in the di-glycerides and the mono-glycerides of the higher fatty acids. It is also to be noted that in the preparation of the epinephrine salts of the lower partial esters, such as the methyl and ethyl partial esters, it is advisable to use relatively larger proportions of the phenol or other solvent in carrying out the reaction. The epinephrine salts of the partial esters are also soluble in benzol, chloroform and carbon tetrachloride.

In the examples heretofore given, other solvents, as set forth above, may be used in place of the phenol. In general, somewhat larger quantities are required.

In preparing products for physiological use, in order to secure materials of satisfactory stability on pharmacological assay, it is important to use highly purified and refined glycerides. Thus, in securing the di-glycerides for such use, it has been found advisable to use fatty acids derived from a highly refined oil fraction. The removal of the solvent used in the reaction, such as phenol, need not be absolute, providing that no more is left in the product than is tolerated in the subsequent use of the material.

It will be understood that the specific details of the examples hereinbefore set forth are not to be regarded as limitations on the scope of the reaction, except in so far as included in the accompanying claims.

I claim:

1. The method of forming an epinephrine salt of an alkyl ester of a partially esterified polybasic acid which comprises reacting upon epinephrine base with a mono-alkyl ester of the polybasic acid in the presence of phenol.

2. The method of forming an epinephrine salt of a mono-alkyl ester of a dicarboxylic acid which comprises reacting upon epinephrine base with a mono-alkyl ester of a di-carboxylic acid in the presence of molten phenol, and removing the phenol by sublimation at low temperature in vacuo.

3. The method of forming an epinephrine salt of a mono-alkyl ester of a di-carboxylic acid which comprises reacting upon epinephrine base with a mono-alkyl ester of a di-carboxylic acid in the presence of a molten phenol and removing the phenol by sublimation at low temperature in vacuo in the presence of a current of inert gas.

4. An epinephrine salt of a lauryl ester of a di-carboxylic acid.

5. Epinephrine salt of the mono-lauryl ester of maleic acid.

6. Epinephrine salt of the mono-lauryl ester of succinic acid.

7. Epinephrine salt of the mono-lauryl ester of phthalic acid.

8. A salt of epinephrine with a carboxylic acid compound of the class consisting of non-halogenated alkyl partial esters of polybasic acids and non-halogenated aryl-alkyl partial esters of polybasic acids.

9. A salt of epinephrine with a non-halogenated alkyl partial ester of a polybasic acid.

10. A salt of epinephrine with a non-halogenated alkyl partial ester of an unsaturated polybasic acid.

11. A salt of epinephrine with a non-halogenated alkyl mono ester of a dicarboxylic acid.

12. A physiologically active epinephrine preparation having a prolonged effect comprising a solution of a salt of epinephrine with a non-halogenated alkyl partial ester of a polybasic acid in a vehicle comprising a normally liquid glyceride of a higher fatty acid.

13. A physiologically active epinephrine preparation having a prolonged effect comprising a solution of a salt of epinephrine with a non-halogenated alkyl mono ester of a dicarboxylic acid in a vehicle comprising a normally liquid glyceride of a higher fatty acid.

EDWIN L. GUSTUS.